United States Patent [19]

Emmons

[11] Patent Number: 4,837,406
[45] Date of Patent: Jun. 6, 1989

[54] FACE PLATE AND ELECTRICAL COMPONENT ASSEMBLY

[76] Inventor: David J. Emmons, 6744 12th Ave. South, Richfield, Minn. 55423

[21] Appl. No.: 56,547

[22] Filed: May 29, 1987

[51] Int. Cl.⁴ .............................................. H02G 3/12
[52] U.S. Cl. ...................................... 174/57; 220/3.7; 439/535
[58] Field of Search ...................... 174/57, 53; 220/3.7; 439/535–539

[56] References Cited

U.S. PATENT DOCUMENTS

| 867,624 | 10/1907 | Warthen. | |
|---|---|---|---|
| 1,862,324 | 9/1928 | Strnad. | |
| 2,410,287 | 10/1946 | Jaberg | 174/53 |
| 3,488,428 | 1/1970 | Smith | 174/51 |
| 3,662,085 | 5/1972 | Robinson et al. | 174/48 |
| 3,770,872 | 11/1973 | Brown | 174/53 |
| 4,105,862 | 8/1978 | Hoehn | 174/53 |
| 4,281,773 | 8/1981 | Mengeu | 220/3.2 |
| 4,295,003 | 10/1981 | Borja et al. | 174/53 |
| 4,306,109 | 12/1981 | Nattel | 174/51 |
| 4,315,100 | 2/1982 | Haslbeck et al. | 174/51 |
| 4,336,416 | 6/1982 | Goodsell | 174/48 |

Primary Examiner—Arthur T. Grimley
Assistant Examiner—David A. Tone
Attorney, Agent, or Firm—Kinney & Lange

[57] ABSTRACT

An assembly includes a face plate and an electrical component that are mounted as a unit within an electrical box by a mounting component that threadably engages the mounting screws of the electrical component and is securable within the electrical box by an adhesive.

11 Claims, 1 Drawing Sheet

U.S. Patent   Jun. 6, 1989   4,837,406
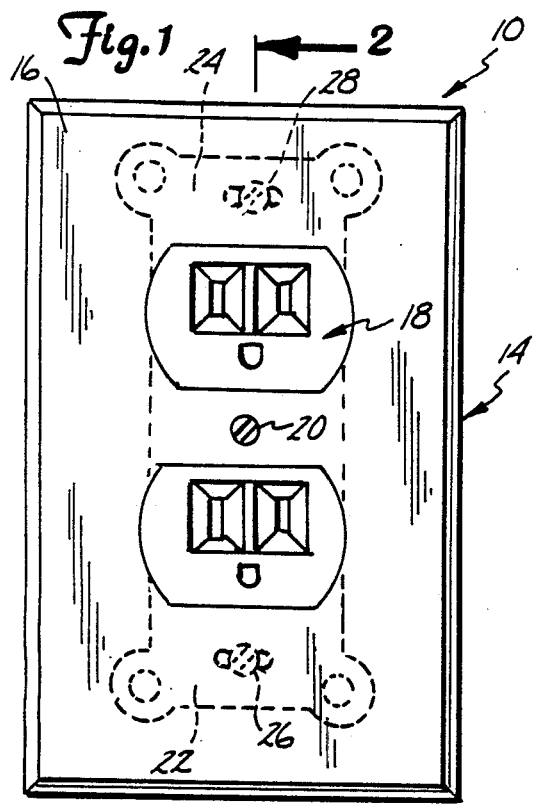
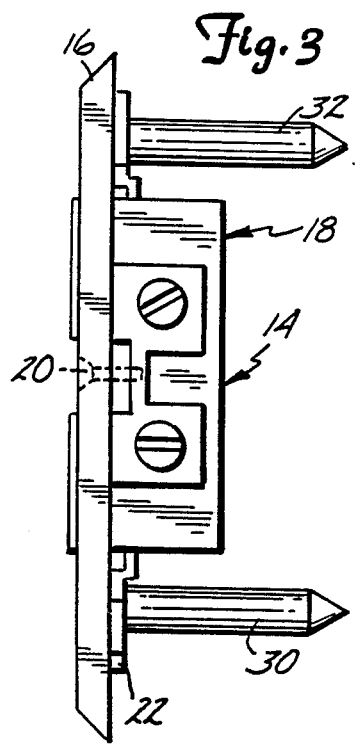
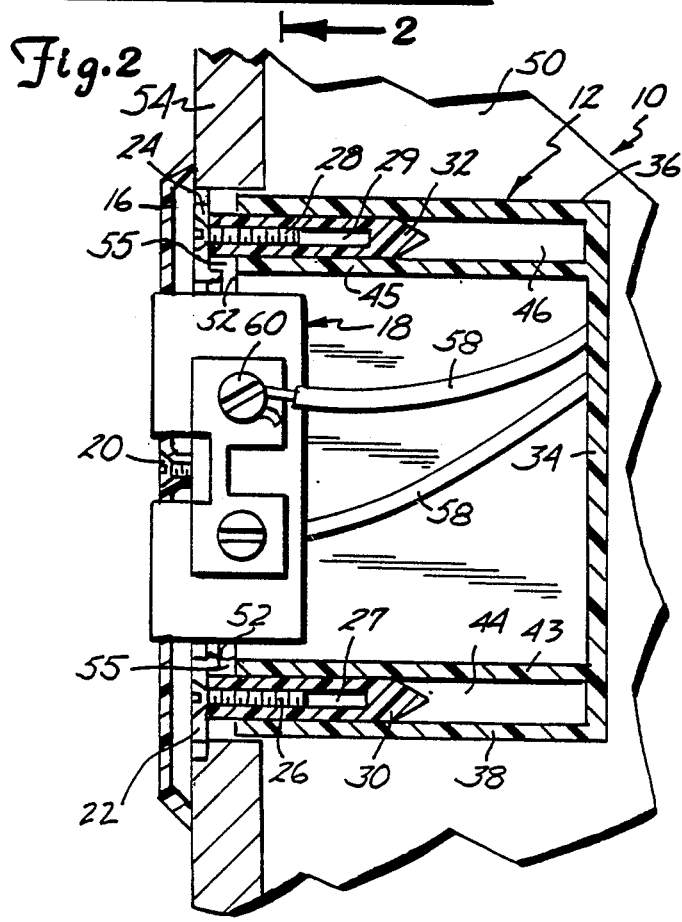
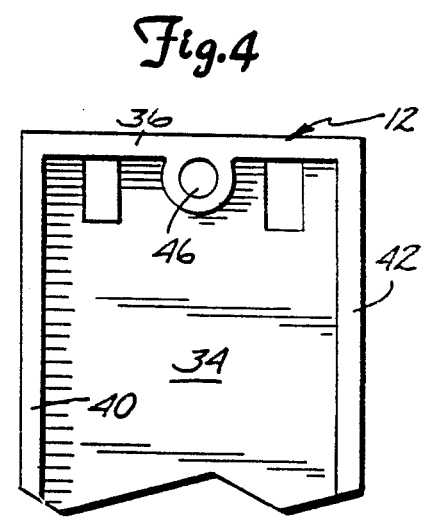

FACE PLATE AND ELECTRICAL COMPONENT ASSEMBLY

BACKGROUND OF THE INVENTION

1. Field of the Invention

The present invention relates to electrical components that are housed in boxes, and in particular, to arrangements for quickly and correctly mounting electrical components within an electrical box.

2. Description of the Prior Art

Outlets and switches are presently mounted in electrical boxes in much the same way that they have been for decades. First, the electrical box is nailed to a stud in the wall or to a joist in the floor or ceiling. Wire is pulled through conduits positioned within the walls, floors and ceilings and through each electrical box. Sheet rock is then typically placed on the studs or joists to form the wall or ceiling surfaces. Templates are used to cut a hole in the sheet rock so that the interior of the box and the electrical wiring is accessible.

In installing electrical components, such as an outlet or a switch, an end portion of the insulation from an end portion of the wires is removed, the wire mounting screws of the outlet are backed off, the wires are attached to the screws, and the screws are tightened. The outlet is then secured to the box by two screws. The face plate is then attached to the outlet by yet another screw.

As is readily apparent, the above procedure involves a good deal of labor.

In addition, since the electrical boxes are fastened to the studs prior to attaching the sheet rock, the front edge of the box may not be aligned properly with the sheet rock wall. Variations in the position of the electrical box relative to the sheet rock occur frequently, causing outlets and switches to be tilted or cocked and sometimes to be drawn too far into the box. When the outlet or switch is drawn too far into the box, attaching a face plate to the outlet or switch can become a problem.

A number of patents describe various methods and structures for more efficiently mounting electrical boxes. These patents include:

| Inventor | Patent No. |
| --- | --- |
| Warthen | 867,624 |
| Smith | 3,488,428 |
| Robinson et al | 3,662,085 |
| Brown | 3,770,872 |
| Hoehn | 4,105,862 |
| Mengeu | 4,281,773 |
| Borja et al | 4,295,003 |
| Nattel | 4,306,109 |
| Haslbeck et al | 4,315,100 |

Other patents have also described various methods and structures for correcting the problem of variations in mounting electrical boxes within walls. These patents include:

| Inventor | Patent No. |
| --- | --- |
| Goodsell | 4,336,416 |
| Jaberg | 2,410,287 |
| Strand | 1,862,324 |

SUMMARY OF THE INVENTION

The present invention includes an assembly having an electrical component, such as an outlet or a switch, that is mountable within an electrical box and has means for adjustably, adhesively securing it in place. The assembly provides for a quick and efficient manner of mounting the electrical component within a box and for compensating for variations in mounting of the box with respect to the wall surface. The assembly of the present invention utilizes a conventional outlet or switch construction and preferably a conventional face plate such that after the installation has been completed, the face plate and switch or outlet may be dissassembled in a conventional manner.

The assembly as shown includes the face plate and the electrical component secured to each other conventionally by a face plate screw or screws. The electrical component includes two conventional mounting screws that extend away from the electrical component and a back surface of the face plate. The assembly further includes means for adhesively mounting the assembly to the electrical box and said means for adhesively mounting are threadably engaged by the two mounting screws. The electrical box has an interior for accepting the electrical component and for housing wiring that is to be attached to the electrical component. The assembly is slid into the electrical box and the adhesive is permitted to cure, securing the assembly to the box.

BRIEF DESCRIPTION OF THE DRAWINGS

FIG. 1 is a front view of the assembly of the present invention.

FIG. 2 is a cross sectional view taken along the line 2—2 of FIG. 1 of the device of the present invention.

FIG. 3 is a side view of the assembly of the present invention.

FIG. 4 is a front view of a portion of the electrical box of the present invention illustrating the boss and bore for receiving the plug.

DETAILED DESCRIPTION OF THE PREFERRED EMBODIMENTS

The device of the present invention is indicated generally at 10 in FIGS. 1 and 2. The device 10 of the present invention includes an electrical box 12 and a face plate and electrical component assembly 14, as best illustrated in FIG. 2. The device of the present invention permits quick and efficient mounting of an electrical component, such as an outlet or a switch, along with a face plate to an electrical box in a quick and efficient manner. In addition, the device of the present invention compensates for variations in mounting of an electrical box with respect to the wall surface.

Referring to FIGS. 1-3, the assembly 14 includes a standard face plate 16 and a standard electrical component 18, such as an outlet or a switch. Although a duplex outlet 18 is specifically shown in the drawings, it will be understood that switches and other electrical components that are mounted in a conventional manner in electrical boxes are includable within the scope of the present invention.

The face plate 16 is secured to the duplex outlet 18 by a face plate screw 20. In the case of a switch, there are typically two face plate screws that attach the face plate to the switch.

Regardless of whether the electrical component is a duplex outlet or a switch, the component typically includes first and second ear members 22 and 24 through which electrical component mounting screws 26 and 28 extend for mounting the component to a conventional electrical box. The screws 26 and 28 threadably engage first and second cylindrical plugs 30 and 32, which are used to secure the assembly 14 to the electrical box 12, as will be described subsequently.

In the prior art, the electrical component is first wired by backing off terminal screws of the electrical component, attaching the wires around the screws, tightening the screws, and then securing the electrical component to the electrical box with screws 26 and 28. The face plate 16 is then mounted to the electrical component by face plate screws.

In the present invention the electrical component is wired in much the same way as in the prior art. However, the face plate and electrical component are one assembly 14 and are secured to the electrical box by adhesive in contrast to the prior art method of using mounted screws to initially secure the electrical component and then the face plate.

The electrical box 12 of the present invention is for the most part a conventional type of electrical box. As illustrated in FIGS. 2 and 4, the box has a back wall 34, a top wall 36, a bottom wall 38 and side walls 40 and 42. As will be understood, although a rectangular box is shown in the drawings, the present invention includes within its scope electrical boxes having other configurations. The electrical box 12 further includes first and second bosses 43 and 45 having plug receiving holes 44 and 46 for receiving the plugs 30 and 32, all respectively. The holes 44 and 46 are disposed adjacent the bottom and top walls 38 and 36 of the box 12 so that the holes are positioned to receive the plugs 30 and 32. The plugs 30 and 32 are secured to bosses 43 and 45 by a suitable adhesive.

Preferably, the box 12 is made of the same type of material as the prior art electrical boxes. The material may be metal, however, plastic or fiberglass if preferred. The plugs 30 and 32 preferably are also made of plastic. Since the plugs 30 and 32 are secured to the box 12 by an adhesive, the plugs and the box should be made of materials that permits adhesive bonding to each other.

In use, the box 12 of the present invention is mounted to a stud of a wall or to a joist of a floor or ceiling in a conventional manner. The sheet rock is then placed over the stud or wall and a template is used to cut a hole in the sheet rock to expose the front opening and interior of the box. Referring to FIG. 2, the box 12 is shown nailed to a stud 50. As illustrated in FIG. 2, a front edge of the box 52 is not correctly positioned with respect to the sheet rock 54. A gap 55 between the front edge of the box and the ears 22 and 24 of the electrical component 18 occurs. In the prior art, the screws 26 and 28 were typically tightened into the box causing the electrical component to be installed too deeply within the box, thereby causing problems in mounting the face plate onto the electrical component.

Using the present invention, the assembly 14 is mounted by applying adhesive to the plugs 30 and 32 or within the holes 44 and 46 and sliding the plugs 30 and 32 within the holes 44 and 46. The face plate abuts against the sheet rock and acts as a stop to correctly position the depth of the plugs within the holes. The adhesive is permitted to cure. Of course, prior to attaching the assembly 14 to the electrical box 12, wires 56 and 58 are attached to the terminal screws 60 of the electrical component in a conventional manner.

It will be appreciated that once the adhesive is cured, the face plate and the electrical component are removable from the box in a conventional manner. The face plate is removed by backing off the face plate screws 20 and the electrical component is removed by backing off the screws 26 and 28 from the plugs 30 and 32. The component 18 can be reinstalled by turning in the screws 26 and 28 into the holes 27 and 29 of the plugs 30 and 32 with the plugs now acting as support posts and being secured to become part of the box.

The sub-assembly of the electrical component screws 26 and 28 and plugs 30 and 32 can be used for compensating for box mounting differences, without the face plate, if plastic ears 22 and 24 on the component rest on the outer surface of the sheet rock or wall board. These form surfaces that engage the outer surface of the wall board to position the plugs prior to gluing.

Although the present invention has been described with reference to preferred embodiments, workers skilled in the art will recognize that changes may be made in form and detail without departing from the spirit and scope of the invention.

What is claimed is:

1. A device comprising:
   an assembly having an electrical component and first and second mounting screws extending from the component and means for adhesively mounting the assembly, said means comprising first and second plugs in threadable engagement with the first and second mounting screws, respectively;
   an electrical box adapted for receiving the assembly and for being adhesively securable to said means for adhesively mounting the assembly including first and second bosses, each having a hole, the holes being positioned to receive the first and second plugs and having substantially smooth interior surfaces defining the holes; and
   the first and second plugs having a smooth external surface and being of substantially constant cross sectional configuration.

2. The device of claim 1 wherein the first and second mounting screws are positioned on opposite sides of the electrical component and the first and second bosses are disposed adjacent opposing walls of the electrical box.

3. A method of mounting an electrical component to an electrical box, the method comprising:
   providing an electrical box;
   providing an electrical component having first and second mounting screws threadably engaging said screws to means for adhesively securing the component to the box; applying adhesive to the means for securing the component to the box;
   inserting the component and means into the electrical box; and
   permitting the adhesive to cure.

4. The method of claim 3 wherein a face plate is secured to the electrical component and further comprising:
   inserting the component into the box until the face plate abuts against a wall surface adjacent an opening leading to the electrical box.

5. The method of claim 3 including hte step of providing the electrical box at a location aligned with an opening in a wall having an outer wall surface, said box being recessed with respect to the outer wall surface, and providing a top surface on the electrical component to end resting on the top surface on the outer wall surface prior to the step of permitting the adhesive to cure.

6. The method of claim 3 wherein the electrical box has first and second bores adjacent opposing walls of the electrical box, and wherein the means for adhesively securing the component includes first and second plugs and further including positioning the first and second plugs into the first and second bores and securing the plugs within the bores using said adhesive.

7. An assembly for inserting into an electrical box comprising:

an electrical component having openings for first and second mounting screws; and means for adhesively mounting the assembly to the electrical box, the means for adhesively mounting the assembly being first and second plugs extending from the component and having substantially smooth exterior surfaces and substantially constant cross sectional shape and being in threadable engagement with first and second mounting screws in the openings of the electrical component.

8. The assembly of claim 7 and means for controlling the position of the electrical component relative to a wall surface having an opening therein providing for access of the electrical component to the electrical box comprising surface means fixed with respect to the electrical compound for engaging a portion of the wall surface surrounding the opening with the means for adhesively mounting the assembly engaging a portion of the electrical box.

9. The assembly of claim 8 wherein the electrical box includes first and second bores, and wherein the bores are positioned to receive the first and second plugs.

10. The assembly of claim 9 wherein the electrical box and the first and second plugs are made of plastic.

11. The assembly of claim 9 wherein the surface means comprises a face plate fixed to the electrical component.

* * * * *

UNITED STATES PATENT AND TRADEMARK OFFICE
CERTIFICATE OF CORRECTION

PATENT NO. : 4,837,406
DATED      : June 6, 1989
INVENTOR(S) : David J. Emmons

It is certified that error appears in the above-identified patent and that said Letters Patent is hereby corrected as shown below:

Column 4, delete lines 50-54, and insert the following:

--providing an electrical component having first and second
     mounting screws;

threadably engaging said screws to means for adhesively securing
     the component to the box;

applying adhesive to the means for securing the component to
     the box;--

Column 4, line 64, delete "hte", and insert --the--.

Signed and Sealed this

Twentieth Day of February, 1990

*Attest:*

JEFFREY M. SAMUELS

*Attesting Officer*     *Acting Commissioner of Patents and Trademarks*